F. G. KOEHLER
PIPE CUTTER.
APPLICATION FILED APR. 28, 1914.
1,126,032.
Patented Jan. 26, 1915.
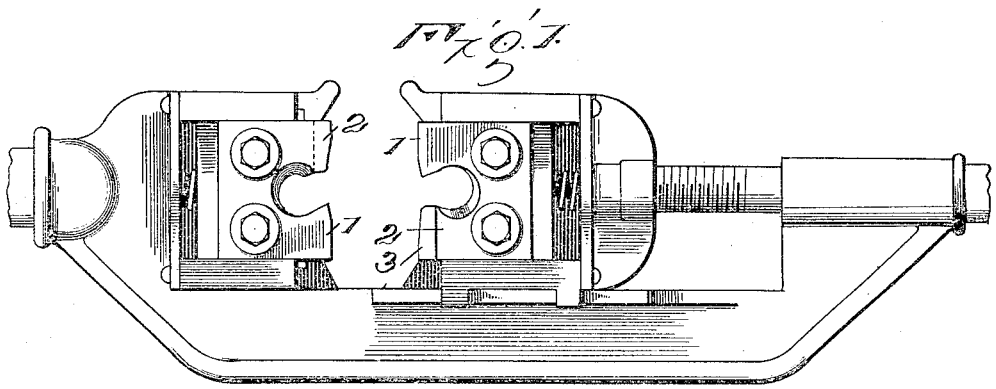
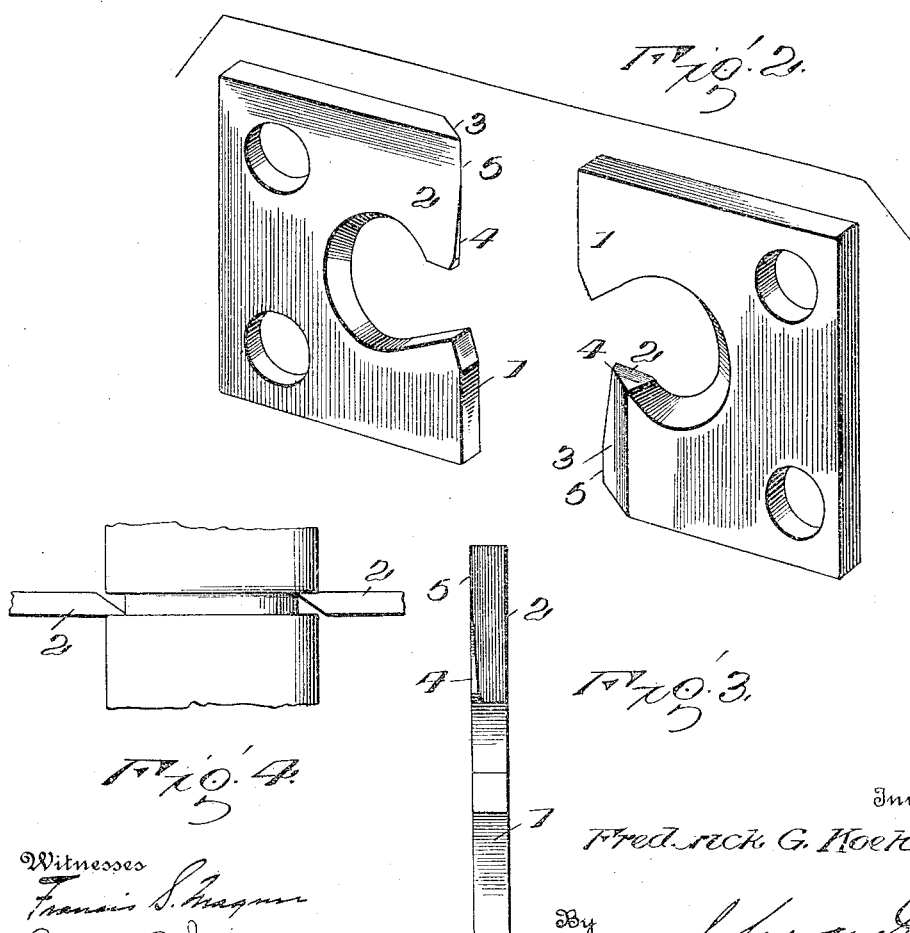
Inventor
Frederick G. Koehler

UNITED STATES PATENT OFFICE.

FREDRICK G. KOEHLER, OF WARREN, OHIO, ASSIGNOR TO THE BORDEN COMPANY, OF WARREN, OHIO, A CORPORATION OF OHIO.

PIPE-CUTTER.

1,126,032.  Specification of Letters Patent.  Patented Jan. 26, 1915.

Application filed April 28, 1914.  Serial No. 834,967.

*To all whom it may concern:*

Be it known that I, FREDRICK G. KOEHLER, of Warren, in the county of Trumbull and State of Ohio, have invented certain new and useful Improvements in Pipe-Cutters; and I do hereby declare the following to be a full, clear, and exact description of the invention, such as will enable others skilled in the art to which it appertains to make and use the same.

In the use of pipe-cutters having square-edge knives it has heretofore been customary to employ guides for limiting the action of the knives under the pressure of the compression springs, and such guides are usually formed with square edges, similar to the edges of the knives. In practice, with such broad-edge guides a sort of bur or deposit builds up on the inner end of each guide, and this naturally affects the cutting depth of the knives, and if the latter are kept away from the work, causing them to ride without cutting, they will be quickly dulled, as it is a well-known fact that a cutting tool riding idly over work will get dull quite as quickly as if it were performing the cutting operation.

The object of the present invention is to obviate the difficulties above noted; to accurately guide the knives while cutting; to maintain a uniform relation between the guides and the knives; and to have the guides aid in breaking down the wall of a pipe at the completion of the cutting operation.

In the accompanying drawing Figure 1 is a side elevation of a pipe-cutter equipped with my present improvements. Fig. 2 is an enlarged view in perspective of the two cutters. Fig. 3 is an edge view of a cutter. Fig. 4 is a plan view of a section of a pipe showing the positions of the guides.

As pointed out in the Howe Patent No. 1,040,202, of October 1, 1912, each cutter is composed of a knife 1 and a shoe or guide 2 which are preferably formed from a single piece of metal with a clearance between the opposed ends of the knife and the guide. The cutting edge of the knife is squared, as in the above-noted patent, but each guide is beveled on one side only, as at 3. In practice two cutters are used in each tool, that is to say, each cutter comprises a knife and a guide. The guides are oppositely beveled, one to the right and the other to the left, so that the straight sides of the guides will bear against opposite walls of the groove cut by the knives in the pipe, and thus guide the tool. This is shown in Fig. 4, wherein the pipe $x$ is represented as having a groove cut therein.

The edge of each guide has a relatively narrow flattened surface 4 which extends from the inner edge of the guide to a point approximately half its length, and from this point to the outer end the edge 5 of the guide is comparatively sharp. The flattened surface constitutes the riding face and is ordinarily the part which engages the work to limit or control the knife. Before any part of the knife actually breaks through the wall of a pipe the flattened surface bears against the pipe, but once the wall of the pipe is broken the relatively sharp edge 5 will come into play and aid in cutting through the thin remaining portion of pipe-wall more quickly than would occur if the riding guide had a continuous flat or square face corresponding to that of the knife. Ordinarily when a cut is nearly completed the remaining thin wall section has a tendency to spring inwardly with the result that for a few revolutions the knives are inclined to ride around without doing much cutting, but by means of my invention the beveled edge bearing on one side of the cut only aids in breaking through much more quickly, and, once the knife breaks through the pipe-wall the sharp edge 5 of the guide aids in cutting through very quickly. Another advantage arising from the present arrangement is that the reduced edge of the guide wears away correspondingly with the knife, and thus automatically maintains a uniform relation between the edges of the knives and guides.

It is well known that a beveled cutter will dull more quickly than a squared cutter. So far as concerns the beveled guide, while the flattened surface 4 thereof has a tendency to wear off in proportion to the wear of the knife, the relatively sharp edge 5 has practically no wear. I have found that by means of my invention the life of a cutter is greatly prolonged, that is to say, there is a very marked increase in the extent to which a single set of cutting knives may be used before replacement or sharpening is necessary.

I claim as my invention:

1. A pipe-cutter having oppositely-disposed knives and guides for limiting the action of the knives, each guide being straight on one side and beveled on the other.

2. A pipe-cutter having oppositely-disdisposed knives and guides for limiting the action of the knives, each knife having a square cutting edge, and each guide being beveled on one side.

3. A pipe-cutter having oppositely-disposed knives and guides for limiting the action of the knives, each guide being beveled on one side and the edge of each guide having a relatively narrow flattened portion extending from its inner end.

4. A pipe-cutter having oppositely-disposed knives and guides for limiting the action of the knives, each guide being beveled on one side and the edge of each guide having a relatively narrow flattened portion extending from its inner end and also having a relatively sharp edge between the flattened portion and its outer end.

5. A pipe-cutter having oppositely-disposed knives and guides for limiting the action of the knives, each knife having a square cutting edge, and each guide being beveled on one side, the edge of each guide having a relatively narrow flattened portion extending from its inner end and also having a relatively sharp edge between the flattened portion and its outer end.

In testimony whereof, I have signed this specification in the presence of two subscribing witnesses.

FREDRICK G. KOEHLER.

Witnesses:
WM. H. BECHTEL,
I. B. TAYLOR.